OSCILLATION CONTROL CIRCUITS

Filed Jan. 30, 1952

INVENTOR
William F. Sands
BY [signature]
ATTORNEY

United States Patent Office 2,743,369

Patented Apr. 24, 1956

2,743,369

OSCILLATION CONTROL CIRCUITS

William F. Sands, Haddonfield, N. J., assignor to Radio Corporation of America, a corporation of Delaware Application January 30, 1952, Serial No. 269,004

10 Claims. (Cl. 250—36)

This invention relates to automatic frequency control circuits and in particular those type circuits in which an oscillator is controlled in frequency by a reactance tube.

In color subcarrier type television systems it is necessary to precisely control the frequency of a local oscillator to effect proper color operation. When the subcarrier is phase modulated any oscillator frequency shift will result in distortion of the television picture color signal components. Accordingly a burst of synchronizing signal is transmitted at the subcarrier frequency to provide automatic frequency control at the color receiver.

This automatic frequency control is generally effected by means of a variable reactance circuit connected for controlling the local oscillator frequency and operable in accordance with phase differences between the local oscillator and the incoming burst.

Because of the precise phase control which must be effected in color subcarrier television systems having a phase modulated subcarrier it has been necessary to provide stabilized power supply systems. This was necessary because known variable reactance control circuits have lacked frequency stability when presented with changes in operating supply potentials. It may be readily seen that if a pentode reactance tube is utilized a change in the screen grid and anode potential with a change in supply potential would change the tube transconductance. The effective control of the reactance tube on the oscillator would then be changed in such a manner that the local oscillator is not synchronized with the incoming burst.

In the past the changes in the reactance tube circuit have been reduced by the provision of improved reactance control apparatus. There is, however, also a change of frequency stability in the oscillator circuit with changes in power supply potential so that even the improved prior art reactance tube circuits cannot afford the desired frequency stability with respect to potential changes.

In accordance with the present invention therefore an oscillation control circuit is provided having stable frequency versus supply potential characteristics. Circuit efficiency is therefore improved since complicated voltage control circuits are not necessary and because the invention makes possible frequency stability without provision of excess component parts. In particular increased efficiency is obtained in accordance with the invention since degenerative control is precluded, and therefore greater gain may be realized from the local oscillator.

Therefore in accordance with the invention there is provided an oscillator circuit having a supply potential versus reactance shift of one sense and a reactance circuit is coupled to the oscillator circuit for controlling the frequency thereof, which has a potential versus reactance shift of an opposite sense. Thus when a common supply potential is connected to both the oscillator and reactance circuits frequency shifts may be cancelled and the resulting oscillator frequency may be stabilized with respect to supply potential changes.

It is therefore an object of the present invention to provide improved oscillation control circuits.

It is another object of the invention to provide automatic frequency control circuits which are stabilized with respect to supply potential changes.

A further object of the invention is to improve the efficiency of oscillation control circuits while likewise improving the frequency stability thereof.

Further objects and advantages of the invention will become apparent when considering the following detailed description of the invention particularly when followed in conjunction with the accompanying drawing, in which.

Figure 1:
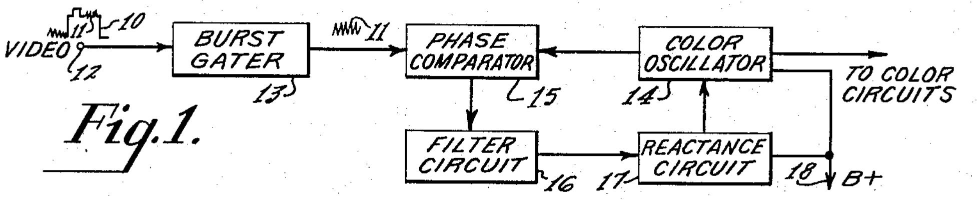
Figure 1 is a block diagram of a portion of a color subcarrier television circuit embodying the invention.

In the block diagram of Figure 1 the organization of the invention is made apparent when associated with a color subcarrier television system having an input signal wave 10 with a burst of subcarrier energy 11 for effecting automatic frequency control. The incoming signal is applied at an input terminal 12 and the burst gater circuit 13 separates the burst 11 from the remainder of the waveform 10. The separated burst may then be compared with the frequency of the local oscillator 14 at the phase comparator circuit 15. Detected phase differences are then filtered in the circuit 16 and applied to a reactance control circuit 17 which is connected to alter the oscillator frequency in the proper direction and magnitude for maintaining its frequency the same as the incoming burst frequency. A supply potential terminal 18 provides B+ for both the oscillator and reactance circuits 14 and 17.

Figure 2:
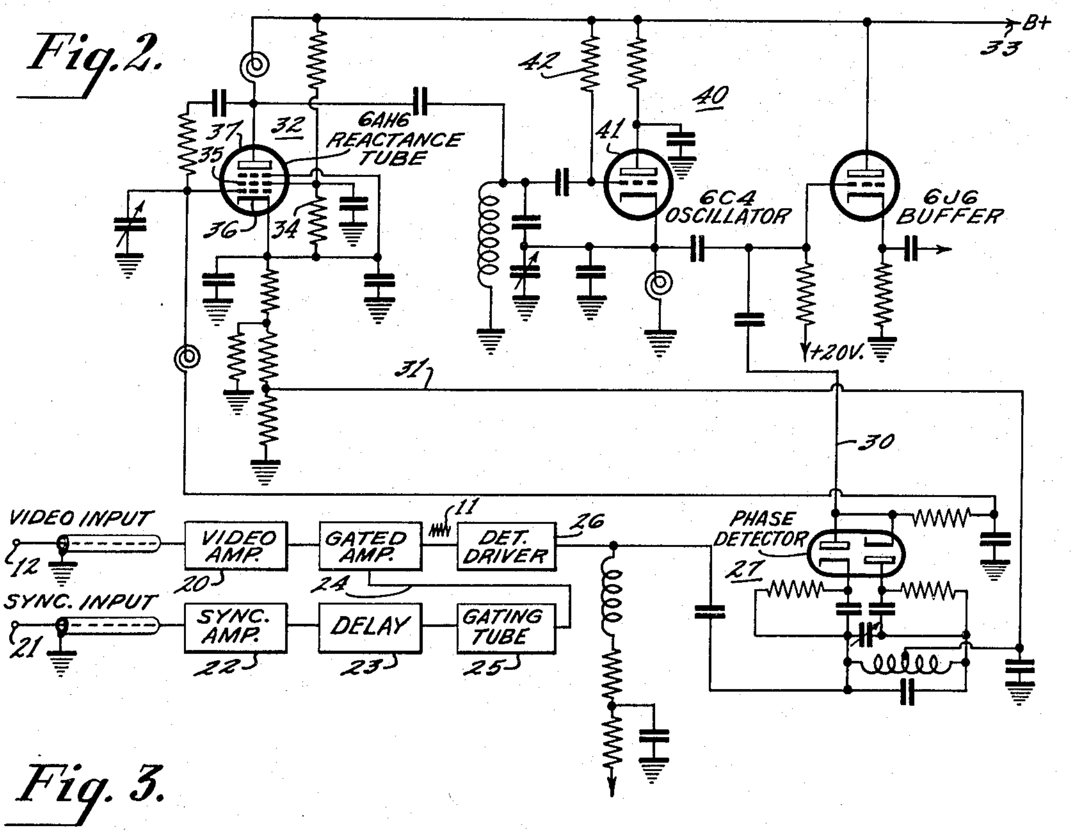
Figure 2 is a combined schematic and block diagram of a circuit including one embodiment of the present invention.

Those features peculiar to the invention are more clearly emphasized in the schematic circuit of Figure 2, wherein those circuits known in the art, whose circuit details form no part of the present invention are shown in block diagram. A video amplifier 20 provides at the video input terminal 12 a combined video signal of which the color burst 11 is gated by the synchronization pulse component afforded at the sync input lead 21 and amplified and delayed by the succeeding stages 22 and 23 to afford at the output lead 24 of the gating tube 25 a signal for removing the burst 11 from the incoming video waveform. The burst is detected at the stage 26 for insertion in the phase detector circuit 27. Comparison of the incoming burst phase with the local oscillator phase, which is sampled by the lead 30, is accomplished by the phase detector 27. Thus, there is provided an output signal at lead 31 which is proportional to phase differences and is therefore suitable for causing a change of reactance in the reactance tube circuit 32.

The reactance circuit itself is well known. A variable reactive potential, inductive in the present circuit, is developed between the anode and cathode output path of the tube is quadrature with the cathode to control grid input potential. The control voltage from lead 31 superimposed at the control grid effects a change of tube transconductance hence varying the reactance at the anode, and thereby controls the local oscillator frequency.

To prevent undue change of reactance tube characteristic with changes in supply potential of the voltage at terminal 33, which would change the operating characteristics of the tube by changing the screen grid and anode potential, degeneration may be afforded at the expense of circuit efficiency. Thus, resistor 34 may be connected between the screen grid 35 and the cathode 36 of the reactance tube 37 when tube gain can be sacrificed. This resistor affords a change of cathode potential with any change in supply potential which will have an opposite effect on the transconductance of the tube as compared with the corresponding simultaneous change of screen grid potential. Over or under compensation may be effected by this means depending upon the values of the coupling network components. As hereinbefore mentioned this means alone is not effective in providing the necessary degree of frequency stability of the entire oscillation control circuit, although it may be used to correct the major instability which lies in the reactance tube portion of the control circuit. In the present invention the degenerative screen grid resistor 34 may be used should the change in reactance tube transconductance with a change in supply potential be of the wrong polarity or of the wrong magnitude to be adequately corrected by designing the oscillator circuit in the manner hereinafter discussed.

The oscillator circuit 40 comprises a triode amplifier tube 41 connected as a Colpitts oscillator. As is well known the Colpitts oscillator includes a tuned circuit connected or coupled with both the input and output electrodes of an amplifier so as to sustain oscillation. In Figure 2, the cathode of tube 41 may be considered as the output electrode of the amplifier while the control electrode of the tube 41 may be considered as the input electrode. Such an oscillator will in general have a tendency to change frequency with a change in supply potential in much the same manner as the reactance tube. It has been found in accordance with the present invention, however, that if the oscillator grid leak resistor 42, which is conventionally grounded at one end, is rather returned to the supply potential terminal 33, the oscillator frequency shift may be controlled. The amount and sense of the frequency change with supply potential variation is dependent upon the value of the grid leak resistor, as indicated from the following table which resulted when a 6C4 oscillator tube was connected to oscillate at a frequency of 3.58 megacycles and the supply potential for the oscillator and reactance tube combined circuit was changed from 218 volts to 120 volts.

| R42 Resistance: | ΔF, cycles |
|---|---|
| Infinity | −7,900 |
| 1.5 megohms | −2,400 |
| 1.0 megohms | −2,050 |
| 680,000 ohms | −1,500 |
| 560,000 ohms | −1,000 |
| 390,000 ohms | −200 |
| 330,000 ohms | +100 |

With the control electrode 50 of the oscillator tube 41 being returned to the common potential supply therefor, it is seen that a grid leak resistor may be selected which will provide in combination with the reactance tube a circuit which is stabilized in frequency variation with respect to supply potential variations. If the reactance circuit is stable with changes in potential the oscillator circuit itself may be stabilized in frequency by connecting the grid leak resistor of a proper value to the anode supply potential of the oscillator tube. The present invention therefore affords a combination of circuit elements whereby an oscillator may be stabilized in frequency with respect to changes in supply potential by coupling the oscillator circuit with a further circuit and affording shifts in reactance in the tube circuits of opposite sense with respect to variations of supply potential.

It is noted that preferably a negative frequency shift is employed since the input impedance may in that manner be kept higher. Should the reactance tube circuit therefore not have the proper sense or magnitude of change, the screen grid degeneration means may be adjusted to provide the desired amount of over or under compensation.

Figure 3:
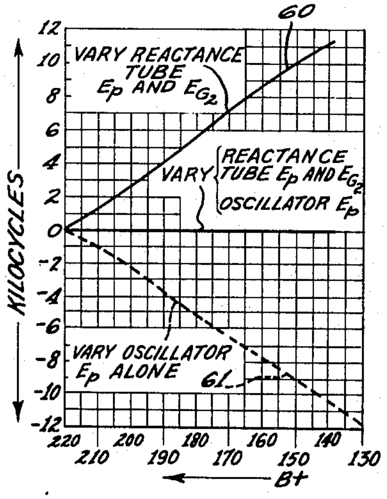
Figure 3 is a graph illustrating the frequency stability characteristics of the invention.

Figure 3 indicates the nature of reactance changes in both the oscillator and reactance control circuits. The frequency change of the reactance control circuit with changes in plate and screen grid potential is indicated by the curve 60. Changes in the oscillator frequency are likewise indicated by curve 61. Since the changes made by the foregoing methods may be made in the magnitudes desired, it is seen therefore that one set of parameters will be found for each circuit which causes a stable frequency characteristic illustrated by the curve 62 when a common supply potential is connected to the anode and control grid of the oscillator tube and the anode and screen grid terminals of the reactance tube. Therefore in accordance with the invention improved oscillation control may be afforded and the cost of effective color subcarrier television systems may be reduced because stabilized power supply sources need not therefore be provided.

Figure 4:
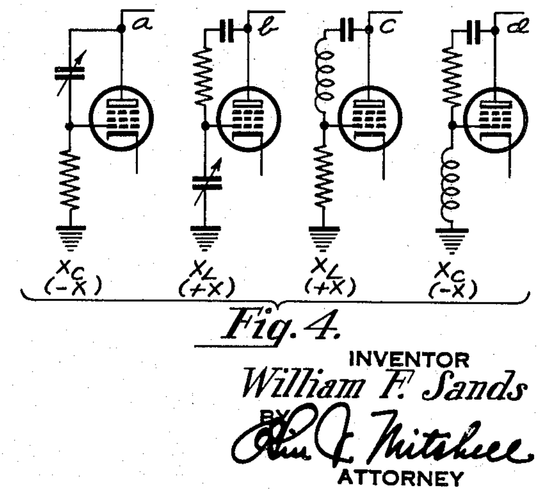
Figure 4 indicates schematically certain modifications which might be made to reactance circuits used in accordance with the invention.

Figure 4 illustrates other reactance circuits which may be utilized in accordance with the present invention to effect the desired control characteristics. Thus, reactive control of either polarity may be chosen by provision of the respective input circuits *4a* to *4d* for the reactance tube. The reactance control circuit or another circuit of similar characteristics and a suitable oscillator circuit coupled thereto therefore may be adjusted respectively to have compensating frequency shifts and thereby effect stabilized frequency shift versus supply potenital variation characteristics in accordance with the present invention.

What is claimed is:

1. An electronic system comprising in combination: an oscillator circuit; means included in said oscillator circuit for producing in said oscillator circuit a supply potential versus frequency shift characteristic of one sense; a reactance circuit coupled to said oscillator circuit for controlling the frequency of the oscillator; means included in said reactance circuit for producing therein a potential versus reactance shift of a sense which influences the frequency of said oscillator in an opposite sense to that of said first named means; and a common potential supply for both said oscillator circuit and said reactance circuit whereby the oscillation frequency is stabilized with respect to common potential supply changes.

2. A system as defined in claim 1 wherein the reactance circuit includes a pentode having a screen grid to cathode resistor and connected as a variable inductance circuit, and the oscillator circuit includes a triode having the control electrode returned through an impedance to the common potential supply.

3. A stabilized oscillator circuit for use in color subcarrier television systems comprising in combination: an oscillator control reactance pentode; a resistive network connected between the control grid and anode of said pentode; a capacitive network connected between the control grid and cathode of said pentode; a resistor connected between the screen grid and cathode of said pentode; a triode connected oscillator circuit coupled to said reactance tube; a source of potential for said circuits commonly connected to the anode and control grid of said triode and the anode and screen grid of said pentode; and impedance means connected between said triode anode and control electrode such to provide a degree of alternating current isolation between said anode and control electrode of said triode.

4. In a stabilized oscillator system the combination of: an oscillator circuit; a source of operating power potential connected in energizing relation to said oscillator circuit, said power potential source being subject to variations in the value of potential delivered thereby; means included in said oscillator causing said oscillator to increase its operating frequency a given amount in response to a given decrease in operating power potential; a variable reactance circuit connected in frequency stabilizing relationship to said oscillator circuit; a power supply connection from said reactance circuit to said source of operating power potential; and means included in said reactance circuit for decreasing the frequency of said oscillator an amount comparable to said given increase in operating frequency in response to said given decrease in operating power potential whereby the frequency of said oscillator tends to be frequency stabilized against given variations in operating power potential.

5. A circuit as defined in claim 4 wherein said oscillator circuit includes a triode amplifier having electrodes corresponding to an anode and control electrode, and said decreasing frequency characteristic is provided by connecting both the control electrode and anode of said triode to a common supply potential terminal, said circuit also including an impedance means connected in series relation with said common supply potential terminal and one of said triode electrodes.

6. A circuit as defined in claim 5 having a pentode reactance tube with a screen to cathode resistive connection.

7. In a stabilized oscillator system the combination of: an oscillator circuit; a source of operating power potential connected in energizing relation to said oscillator circuit, said power potential source being subject to variations in the value of potential delivered thereby; means included in said oscillator causing said oscillator to increase its operating frequency a given amount in response to a given change in operating power potential; a variable reactance circuit connected in frequency stabilizing relationship to said oscillator circuit; a power supply connection from said reactance circuit to said source of operating power potential; and means included in said reactance circuit for decreasing the frequency of said oscillator an amount comparable to said given increase in operating frequency in response to said given change in operating power potential whereby the frequency of said oscillator tends to be frequency stabilized against given variations in operating power potential.

8. An oscillation control system comprising: a Colpitts oscillator circuit including a triode amplifier tube having at least two operating electrodes designated respectively as an anode and control electrode; a reactance control tube connected to control said oscillator circuit; potential supply connections common to the control tube and the anode and control electrode of said triode; and impedance means connected between one of said triode operating electrodes and said potential supply connections such to electrically isolate to a degree said triode operating electrodes whereby to permit triode type amplifier operation.

9. In an oscillator circuit the combination of: an amplifier tube having an output electrode, a cathode and a control electrode; tuned circuit means so connected with said output electrode and said control electrode that the operating frequency characteristic of said oscillator is rendered a function of the operating potential applied between said output electrode and said cathode; power supply means having one terminal thereon connected to said output electrode and another terminal thereon to said cathode to supply an operating potential to said output electrode with a positive potential relationship to said cathode; resistance means connected from said control electrode to said power supply means output electrode extremity, the value of said resistance means being so chosen as to provide a frequency change versus power supply potential change characteristic in said oscillator which is inverse and substantially complementary to the frequency change versus output electrode potential change characteristic.

10. A Colpitts oscillator circuit including: an amplifier tube having an anode, cathode and grid, said oscillator circuit further including a reasonant input circuit defined between said control electrode and said cathode, a resonant output circuit defined between said anode and cathode, and a positive feedback impedance connected in common with said input and output circuits to produce sustained oscillation by said oscillator; an anode voltage supply means having a positive terminal connected with said anode and a relatively negative terminal connected with said cathode; a grid leak resistor connected between said grid and said voltage supply means at a terminal therein which is positive with respect to said cathode, the value of said grid leak resistor and the value of the potential at the voltage supply terminal to which said grid leak resistor is connected being such that the frequency of said oscillator is caused to decrease in response to an increase in the voltage delivered by said voltage supply means.

References Cited in the file of this patent

UNITED STATES PATENTS

| | | |
|---|---|---|
| 2,427,231 | Sear | Sept. 9, 1947 |
| 2,446,032 | Watts | July 27, 1948 |
| 2,545,349 | Foster | Mar. 13, 1951 |
| 2,568,533 | Artzt | Sept. 18, 1951 |